(12) United States Patent
Gudewer

(10) Patent No.: US 9,450,460 B2
(45) Date of Patent: Sep. 20, 2016

(54) ELECTRIC GENERATOR FOR A WIND POWER INSTALLATION

(75) Inventor: Wilko Gudewer, Norden (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 603 days.

(21) Appl. No.: 13/882,971

(22) PCT Filed: Oct. 31, 2011

(86) PCT No.: PCT/EP2011/069112
§ 371 (c)(1),
(2), (4) Date: Jul. 22, 2013

(87) PCT Pub. No.: WO2012/059461
PCT Pub. Date: May 10, 2012

(65) Prior Publication Data
US 2013/0313835 A1    Nov. 28, 2013

(30) Foreign Application Priority Data
Nov. 4, 2010    (DE) .................. 10 2010 043 426

(51) Int. Cl.
*H02K 1/18*    (2006.01)
*H02K 5/04*    (2006.01)
*H02K 7/18*    (2006.01)

(52) U.S. Cl.
CPC ............. *H02K 1/185* (2013.01); *H02K 7/183* (2013.01); *H02K 7/1838* (2013.01)

(58) Field of Classification Search
CPC .......... H02K 1/185; H02K 1/18; H02K 5/04; H02K 7/183

USPC .......... 310/216.136, 216.111, 216.109, 418, 310/422, 428, 429, 430, 432, 433
See application file for complete search history.

(56) References Cited

U.S. PATENT DOCUMENTS

| | | | | |
|---|---|---|---|---|
| 1,685,054 A | * | 9/1928 | Hibbard | H02K 1/185 310/216.114 |
| 2,973,442 A | | 2/1961 | Wilson | |
| 3,708,707 A | | 1/1973 | Kranz | |
| 4,469,973 A | * | 9/1984 | Guyot | H02K 1/185 310/433 |
| 2011/0140552 A1 | | 6/2011 | Lokhandwalla et al. | |

FOREIGN PATENT DOCUMENTS

| | | |
|---|---|---|
| CN | 101578749 A | 11/2009 |
| DE | 1 232 651 | 1/1967 |
| DE | 1 808 577 | 8/1969 |

(Continued)

OTHER PUBLICATIONS

Taiwan Office Action dated Dec. 10, 2013.

*Primary Examiner* — Michael Andrews
(74) *Attorney, Agent, or Firm* — Seed Intellectual Property Law Group PLLC

(57) ABSTRACT

The invention relates to an electrical generator comprising a stator which has windings lying in grooves formed by metal sheets and which has a predetermined diameter and a predetermined depth. The metal sheets form a laminated core which is penetrated by threaded bolts, the front and rear end of the laminated core being mounted on a ring of the stator. According to the invention, an additional mounting point for the laminated core is formed on the stator ring, said mounting point being located approximately in the center of the stator ring.

10 Claims, 2 Drawing Sheets

(56) References Cited

FOREIGN PATENT DOCUMENTS

| | | |
|---|---|---|
| DE | 2 148 827 | 4/1973 |
| DE | 100 40 236 A1 | 3/2002 |
| EP | 0 022 314 A1 | 1/1981 |
| EP | 8 087 116 A1 | 8/1983 |
| EP | 0 367 044 A1 | 5/1990 |
| FR | 694776 A | 12/1930 |
| SU | 1737627 A1 | 5/1992 |
| TW | 282187 | 7/1996 |
| TW | M312834 | 5/2007 |

* cited by examiner

ELECTRIC GENERATOR FOR A WIND POWER INSTALLATION

BACKGROUND

1. Technical Field

The invention concerns an electric generator, for example a generator in the form of a synchronous generator or also in the form of a ring generator for a wind power installation.

2. Description of the Related Art

Generators are known and are produced for example in large numbers for wind power installations by Enercon GmbH, Aurich, and the power output of such generators is certainly in the region of 500 kW or more, and at its peak also up to 7.5 MW or more.

Such generators are of a diameter which in part is considerable because the Enercon wind power installations do not have any transmission gear and the diameter in that case can fluctuate between 3 and 12 meters (m) or more depending on the respective power output of the generator.

The rotary speed of such generators (also referred to as synchronous or ring generators) is about 10 to 22 revolutions per minute by virtue of the direct coupling of the generator rotor to the aerodynamic rotor of the wind power installation. That therefore involves generators which are classified as 'slow-running' and the generators used are in that case multi-pole generators for example with 78 poles or pairs of poles.

As in any electric generator the generator comprises a stator and a rotor (the term rotor in this context is distinguished from the term rotor which is generally used in the case of wind power installations for the rotating part of the aerodynamic system, that is to say the aerodynamic rotor).

The depth of such generators is in the region of 200 to 800 mm.

The generator stator comprises a stator ring which receives laminated sheet assemblies which are provided with grooves and which constitute a closed assembly over 360° at the inside of the stator ring. The turns of the electric generator system are placed in the grooves of the laminated sheet assemblies and the electric power is induced in those turns in operation of the generator.

The sheets of the laminated sheet assembly are conventional dynamo sheets. They are laid manually or by machine in accordance with a given pattern and in that case are also carried by screw bolts which after the laminated sheet assembly is finished are fixedly tightened to press the individual sheets against each other.

The laminated sheet assembly itself after production thereof is finished is fixed to the stator ring, for example by screwing or welding.

As state of the art attention is directed generally to U.S. Pat. No. 3,708,707 A, U.S. Pat. No. 2,973,442 A, U.S. Pat. No. 1,685,054 A, DE 1 232 651 B and DE 2 148 827 A.

The previous system of the generator has proven to be highly reliable.

BRIEF SUMMARY

There is a desire to produce generators which are of a greater depth than described above and has a reliable operation and in particular an air gap which remains the same between the stator and the rotor is then suitably maintained.

In the state of the art hitherto laminated sheet assemblies were fixed to the stator ring only at two locations.

If however the generator depth increases, for example to 1200 mm (or more), and the laminated sheet assemblies therefore become axially even longer, care is also then to be taken to provide that the air gap between the stator and the rotor remains the same and reliable cooling and thus good heat transmission between the turns/sheets of the generator on the one hand and the cooling passages in the stator ring or stator carrier on the other hand is afforded. In one embodiment there is provided that the laminated sheet assemblies and thus the sheets remain directly in contact in relation to the stator ring over the entire width of the generator. The laminated sheet assemblies are fixed to the stator ring not only at their outer locations at two points but also at at least one further point, namely approximately in the center of the laminated sheet assembly.

According to one or more embodiments of the invention there is provided a laminated sheet assembly that is prevented from 'sag', that is to say it does move downwardly under its own weight, which ultimately could result in a reduction in the air gap or in the worst-case scenario could lead to the stator and the rotor touching each other mechanically.

DETAILED DESCRIPTION

The invention is described in greater detail hereinafter by means of an illustrated embodiment.

Figure 1:
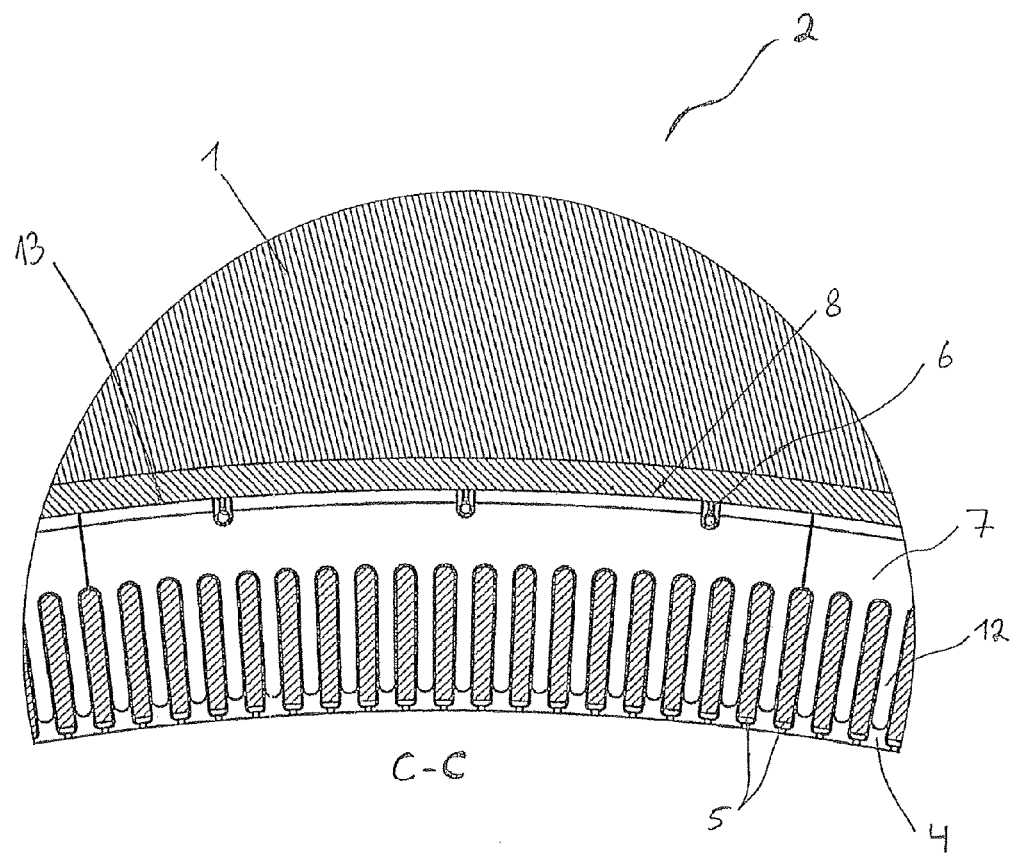
FIG. 1 is cross section of a portion of a stator in accordance with one embodiment of the invention.
Figure 2:
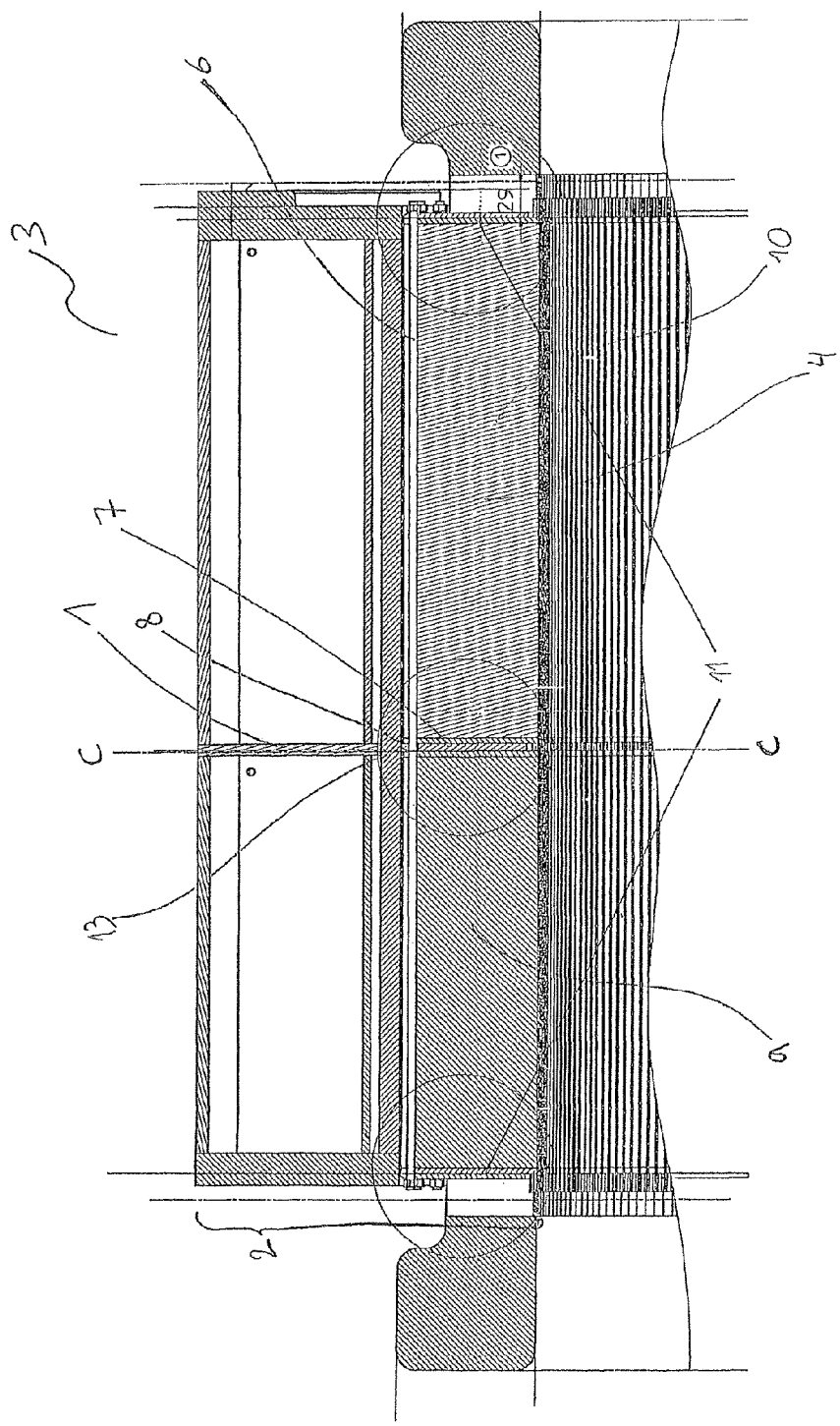
FIG. 2 is a cross section of a portion of a generator that includes the stator of FIG. 1.

FIG. 1 shows a portion of a stator ring 1 of a stator 2 of a generator 3 taken along lines C-C of FIG. 2, for example the synchronous generator of a wind power installation. Provided within the stator ring 1 is a laminated sheet assembly 4 which is formed by placing a plurality of individual (dynamo) sheets (not shown) one upon the other.

The laminated sheet assembly 4 forms grooves 5 into which the coils for the stator 2 are later fitted. The laminated sheet assembly 4 itself has a plurality of screw bolts 6 passing therethrough and is closed in the illustrated example by a support ring 7. As can be seen from FIG. 1 the screw bolts 6 also pass through that support ring 7 and the latter is fixed to the stator ring 1 at the point 13 by means of a weld seam 8.

The support ring 7 as shown in FIG. 1 is not disposed at the outside of the laminated sheet assembly but approximately in the center—see FIG. 2—so that, after welding of the support ring 7, further sheets can be placed on the support ring to form a second part 9 of the overall laminated sheet assembly 10 of the stator 2.

FIG. 2 shows a cross-section through the generator 3 according to the illustrated embodiment of the invention. It is to be seen in that respect that the screw bolts 6 pass through the entire laminated sheet assembly 10 and the support ring 7 and the laminated sheet assembly 10 is delimited at its outsides by pressure plates 11. The screw bolts 6 are provided with a high tightening moment in order to press the sheets of the laminated sheet assembly 4, 9, 10 against each other as tightly as possible. The pressure plates 11 which bear against the laminated sheet assembly at the outside and which are of a great width in comparison with the individual sheets of the laminated sheet assembly are welded to the stator ring 1. That also applies to the support ring 7 approximately at the center of the laminated sheet assembly so that the entire laminated sheet assembly is fixedly connected to the stator ring 1 at at least three points. The individual sheets of the laminated sheet assembly, like also the support ring, have corresponding bores for receiving the screw bolts 6 so that the sheets are also carried by the screw bolts 6.

The described generator 3 illustrated in the drawing is preferably of a depth of about 1200 mm and of an outside diameter for the stator of about 5 m. Preferably the generator 3 is disposed in a wind power installation.

The generator 3 according to the illustrated embodiment is also distinguished in that the entire laminated sheet assembly 10 is divided into two subregions 4, 9 which are separated by the described support ring 7. That can also be seen when viewing on to the stator windings of the finished generator because the support ring 7 is of a relatively great thickness in comparison with the sheets and the support ring has fingers 12 which are not entirely as long as the groove depth formed by the grooves 5 of the dynamo sheets.

In FIG. 1 the support ring 7 can be seen as resting on the laminated sheet assemblies at the top. As mentioned the laminated sheet assemblies comprise sheets which are placed one upon the other and which respectively have the illustrated groove shapes. A given number of sheet layers, for example 5 to 20 sheet layers, namely the sheet layers which lie directly beneath the support ring 7, are also preferably glued together in order in that region to ensure that the sheets are held together in the best possible fashion there, because the sheets themselves at their free end are not completely covered by the fingers 12 of the support ring 7 which preferably comprises the same material as the pressure plates and is preferably also of the same shape.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electric generator comprising:
a stator having windings that are disposed in grooves formed by sheets, wherein the sheets form a laminated sheet assembly through which screw bolts pass, and wherein the laminated sheet assembly has front and rear ends that are fixed to a stator ring of the stator, wherein a fixing point of the laminated sheet assembly is provided on the stator ring, wherein said fixing point is approximately in the center of the stator ring and a support ring is welded to the fixing point, wherein the support ring extends between the laminated sheet assembly divides the laminated sheet assembly into two parts such that the two parts are separated by the support ring.

2. The generator according to claim 1 wherein the generator has a depth between about 1000 mm to 1200 mm, and has a diameter of between about 2 m to 5 m, and has a nominal power output of between about 1 MW to 3 MW.

3. A wind power installation comprising:
a generator including:
a rotor; and
a stator that includes:
a stator ring;
a laminated sheet assembly having first and second ends and a center therebetween, the first and second ends of the laminated sheet assembly being fixed to the stator ring, and the center of laminated sheet assembly being fixed to the stator ring a fixing point; and
a support ring fixed to the fixing point, the support ring extending in the laminated sheet assembly and separating the laminated sheet assembly into two regions.

4. The wind power installation according to claim 3 wherein the laminated sheet assembly includes a plurality of individual sheets stacked on one another.

5. The wind power installation according to claim 3 wherein the first and second ends of the laminated sheet assembly is fixed to the stator ring by bolts.

6. The wind power installation according to claim 3 wherein the support ring is welded to the fixing point.

7. An electric generator comprising:
a stator including:
a stator ring;
a laminated sheet assembly having a plurality of grooves, the laminated sheet assembly having first and second ends and a center therebetween, the first and second ends of the laminated sheet assembly being fixed to the stator ring, and the center of laminated sheet assembly being fixed to the stator ring a fixing point;
windings disposed in the grooves of the laminated sheet assembly; and
a support ring having a first portion welded to the fixing point and a second portion extending between a middle portion of the laminated sheet assembly.

8. The electric generator according to claim 7 wherein the laminated sheet assembly includes a first plurality of individual sheets stacked on one another and a second plurality of individual sheets stacked on one another, the support ring separating the first plurality of individual sheets from the second plurality of individual sheets.

9. The electric generator according to claim 8 wherein the support ring is welded to the fixing point.

10. The electric generator according to claim 8 wherein the laminated sheet assembly includes two regions that are separated from each by the support ring.

* * * * *